United States Patent
Kailas et al.

(10) Patent No.: US 7,502,890 B2
(45) Date of Patent: Mar. 10, 2009

(54) METHOD AND APPARATUS FOR DYNAMIC PRIORITY-BASED CACHE REPLACEMENT

(75) Inventors: Krishnan Kunjunny Kailas, Tarrytown, NY (US); Rajiv Alazhath Ravindran, Ann Arbor, MI (US); Zehra Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 11/482,924

(22) Filed: Jul. 7, 2006

(65) Prior Publication Data
US 2008/0010414 A1    Jan. 10, 2008

(51) Int. Cl.
*G06F 12/12* (2006.01)
(52) U.S. Cl. ...................................... 711/133
(58) Field of Classification Search ........................ None
See application file for complete search history.

(56) References Cited

U.S. PATENT DOCUMENTS

| | | | |
|---|---|---|---|
| 5,924,116 | A | 7/1999 | Aggarwal et al. |
| 5,956,744 | A | 9/1999 | Robertson et al. |
| 6,012,126 | A | 1/2000 | Aggarwal et al. |
| 6,292,871 | B1 * | 9/2001 | Fuente ........................ 711/136 |
| 6,378,042 | B1 | 4/2002 | Henderson et al. |
| 6,532,520 | B1 | 3/2003 | Dean et al. |
| 6,785,770 | B2 | 8/2004 | Hoogerbrugge et al. |
| 2004/0078516 | A1 | 4/2004 | Henderson et al. |
| 2005/0114605 | A1 | 5/2005 | Iyer et al. |

OTHER PUBLICATIONS

Prabhat Jain, Srinivas Devadas, Larry Rudolph, "Controlling Cache Pollution in Prefetching With Software-assisted Cache Replacement", CSG Memo 462, MIT, Jul. 2001.
Zhenlin Wang, Kathryn McKinley, Arnold Rosenberg, Charles Weems, "Using the Compiler to Improve Cache Replacement Decisions", PACT 2002.
Prabhat Jain, Srinivas Devdas, "Software-assisted Cache Replacement Mechanisms for Embedded Systems", Proceedings of the Int'l Conference on Computer-Aided Design, Nov. 2001.
Jennifer Sartor, Subramanian Venkiteswaran, Kathryn McKinley, Zhenlin Wang, "Cooperative Caching with Keep-Me and Evict-Me", 9th Annual Workshop on Interaction between Compilers and Computer Architectures {Interact -9}, Feb. 2005.
D.B. Kirk "SMART {Strategic Memory Allocation for Real-Time} Cache Design," Proc. 10th Real-Time Systems Symp., pp. 229-237, Dec. 1989.

* cited by examiner

*Primary Examiner*—Reginald G Bragdon
*Assistant Examiner*—Thanh D Vo (57) ABSTRACT

One embodiment of the present method and apparatus for dynamic priority-based cache replacement includes selectively assigning relative priority values to at least a subset of data items in the cache memory system, fetching a new data item to load into the cache memory system, the data item being associated with a priority value, and selecting an existing data item from the cache memory system to replace with the new data item, in accordance with the relative priority values and the priority value of the new data item.

20 Claims, 9 Drawing Sheets

METHOD AND APPARATUS FOR DYNAMIC PRIORITY-BASED CACHE REPLACEMENT

FIELD OF THE INVENTION

The present invention relates generally to data processing systems and relates more particularly to the management of data stored in cache memory systems.

BACKGROUND

The performance gap between the processor and the memory system in computing systems has been steadily increasing. With every generation, processors are being clocked at higher rates, while memory systems have been unable to catch up to this exponential growth. The resultant performance gap has caused a major bottleneck for single-thread performance in modern day processors, as the memory system is generally unable to supply data to the processor core at the rate of execution of the processor.

Traditional means of reducing this performance gap include the use of cache memory of varying sizes and levels, which provides temporary storage for and quick access to frequently used data. Cache memory is conventionally managed by hardware, which attempts to cache the most frequently accessed data while purging older, unused data and fetching data from nearby memory locations, thus retaining the working set of the program in cache. Other approaches implement software-managed cache or "scratch pads" for better data management.

Although there are many advantages to using hardware-managed and software-managed cache systems, a common drawback of both is the difficulty in efficiently managing cache replacement (i.e., when to purge old data and replace it with new data). In particular, it is difficult to determine whether certain older data in cache may be purged to make room for newer data, or whether the older data needs to be kept longer in cache (i.e., may still be useful). Conventional schemes for assigning priority to data in cache rely solely programmer-specified hints or compile-time analysis, and thus are based on static determinations that do not account for run-time changes.

Thus, there is a need in the art for a method and apparatus for dynamic priority-based cache replacement.

SUMMARY OF THE INVENTION

One embodiment of the present method and apparatus for dynamic priority-based cache replacement includes selectively assigning relative priority values to at least a subset of data items in the cache memory system, fetching a new data item to load into the cache memory system, the data item being associated with a priority value, and selecting an existing data item from the cache memory system to replace with the new data item, in accordance with the relative priority values and the priority value of the new data item.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It Is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for dynamic priority-based cache replacement. In one embodiment, the present invention assigns one of a plurality of priority levels to each data item in cache, based on the data item's reuse properties. When a new data item is to be loaded into cache, a data item with a higher priority level will always replace a data item with a lower priority level in the same cache set. Thus, the replacement of data items can be manipulated by assigning different priority values to reduce the occurrence of cache "misses" (i.e., when the required data does not reside in cache and must be fetched) and narrow the performance gap between the processor and the memory system.

Figure 1:
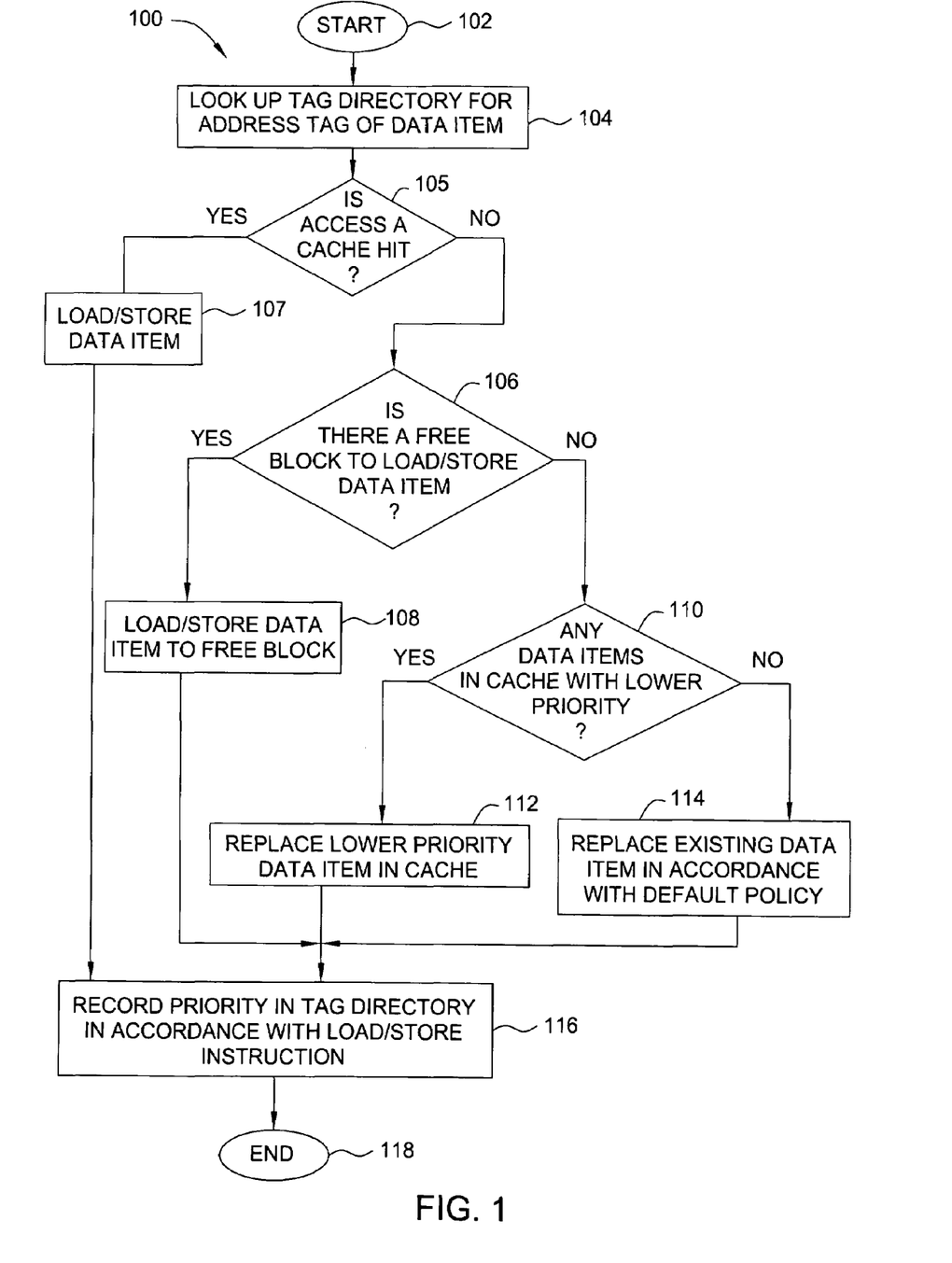
FIG. 1 is a flow diagram illustrating one embodiment of a method for cache replacement, according to the present invention.

FIG. 1 is a flow diagram illustrating one embodiment of a method 100 for cache replacement, according to the present invention. The method 100 may be implemented, for example, by a cache controller that controls access to a cache memory system.

The method 100 is initialized at step 102 and proceeds to step 104, where the method 100 accesses a data item required by a load/store instruction by checking the tag directory to see if the data item is in the cache array.

In step 105, the method 100 determines whether the access is a cache hit (i.e., whether the tag corresponding to the address of the accessed data item is found in the tag directory). If the method 100 concludes in step 105 that the access is a cache hit, the method 100 proceeds to step 107 and accesses the location of the cache array block that is mapped to the data address specified by the load/store instruction (i.e., to either load the data item to the processor or to store a new data item specified by the load/store instruction to the cache array block). The method 100 then proceeds to step 116 to record a priority of the data item, as described in greater detail below.

Alternatively, if the method 100 concludes in step 105 that the access is a cache miss (i.e., a cache load miss or a cache store miss encountered while trying to store the data item), the method 100 proceeds to step 106 and determines whether a free block exists in the cache to which the data item can be loaded/stored. If the method 100 concludes in step 106 that there is a free block in cache, the method 100 proceeds to step 108 and loads/stores the data item to the free block.

Alternatively, if the method 100 concludes in step 106 that no free blocks exist in cache, the method 100 proceeds to step 110 and determines whether there are any data items in cache that have a lower priority than the priority of the data item to be fetched (in the case of a load instruction) or stored (in the case of a store instruction). In one embodiment, the priority of the data item is specified by the load/store instruction, as described in greater detail below.

If the method 100 concludes in step 110 that there is an existing data item in cache that has a lower priority than the data item to be fetched/stored, the method 100 proceeds to step 112 and replaces the lower-priority data items with the new data item accessed by the load/store instruction. Alternatively, if the method 100 concludes in step 110 that there are no lower-priority data items in cache, the method 100 proceeds to step 114 and replaces an existing data item with the data item accessed by the load/store instruction, in accordance with a default policy used by the cache controller (and implemented entirely in hardware), such as the least recently used (LRU) or most frequently used (MFU) policies. In the event that an existing data item in cache has not been assigned a priority, the data item will be assumed to have a median priority for the purposes of making replacement decisions.

In step 116, the method 100 records a priority of the data item in a cache tag directory, in accordance with the load/store instruction. As will be described in further detail below, the priority of a data item is dictated by a priority of the corresponding load/store instruction. As will also be described in further detail below, the cache tag directory is implemented in accordance with the present invention to track and record the priority of data items stored in cache. The method 100 then terminates in step 118.

Thus, instead of always replacing, for example, the data item at the LRU position in cache, the method 100 optimizes cache replacement by prioritizing data items in cache in accordance with a multi-level priority system. A data item with a higher priority level will always replace a data item with a lower priority level in the same cache set. If all data items in a given cache set are of higher or equal priority to a new data item, the least recently used data item is replaced, regardless of its relative priority. In one embodiment, data items with the lowest priority may be ignored such that, instead of fetching the data item into cache, the data item is bypassed, thereby reducing occurrence of cache pollution. Thus, high-priority data items with higher relative rates of reuse by load/store instructions are less likely to be replaced with lower-priority data items that are likely to cause fewer cache misses or relatively less of a slowdown in execution time.

Figure 2:
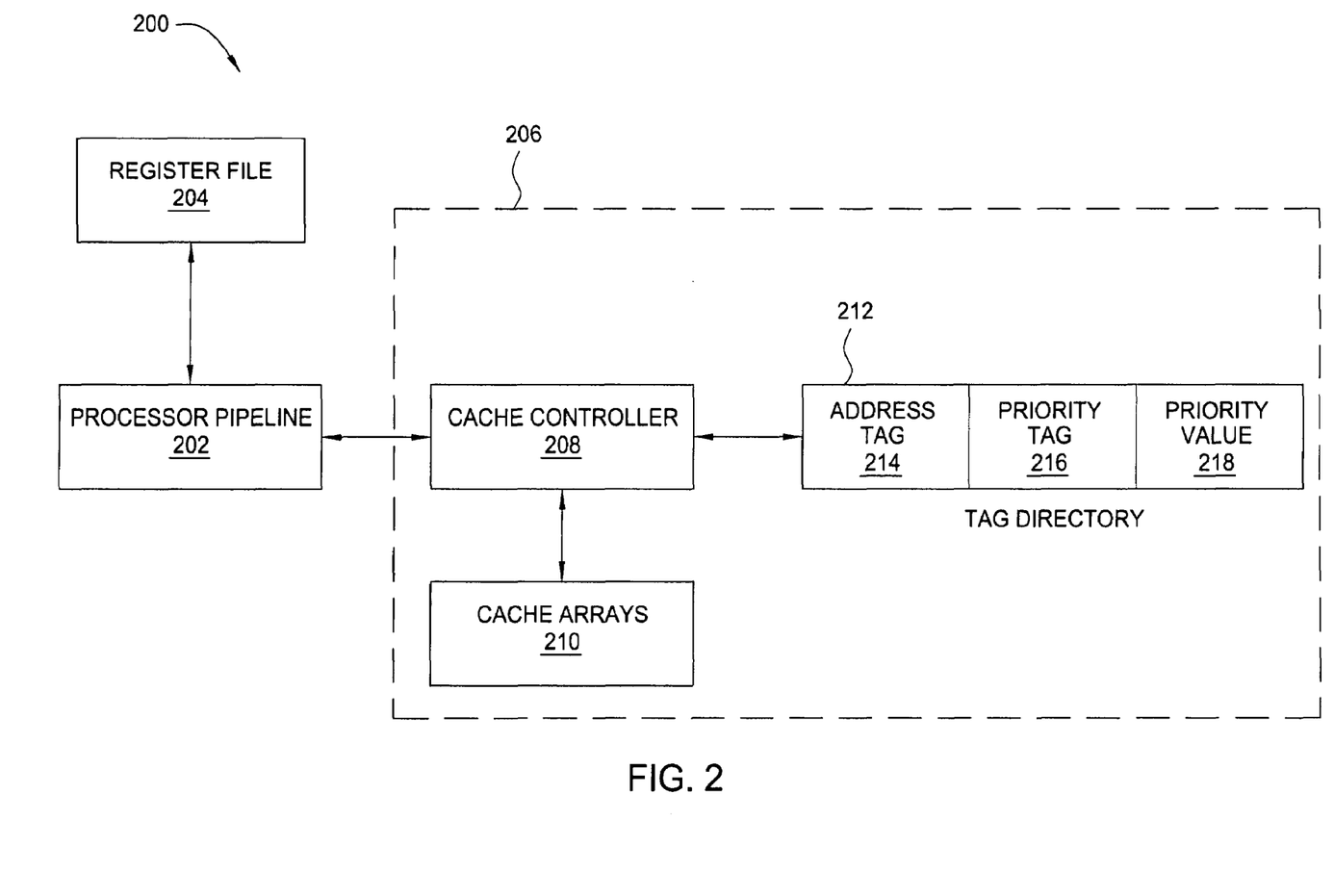
FIG. 2 is a high-level block diagram illustrating one embodiment of a data processing system, according to the present invention.

FIG. 2 is a high-level block diagram illustrating one embodiment of a data processing system 200, according to the present invention. The data processing system 200 provides hardware support for a software-specified priority-based cache replacement system as described herein. To this end, the data processing system 200 comprises a processor pipeline 202, a register file 204 and a cache memory system 206.

The processor pipeline 202 makes requests for reading and writing data from the register file 204 and from the cache memory system 206. The cache memory system 206 comprises a cache controller 208, cache arrays 210 and a tag directory 212. The cache controller 208 controls access to data items stored in the cache arrays 210, while the tag directory 212 maintains references to data items in memory that correspond to the data items in the cache arrays 210. Although the cache hierarchy of the data processing system 200 may comprise multiple levels of cache, only one level of cache will be referred to herein for the purposes of clarity. Thus, the following discussion is applicable to a specific level, to selected levels and to all levels of cache in a memory hierarchy. A decision as to whether to apply priority-based cache replacement in accordance with the present invention to a particular level or levels of cache will depend on a number of factors including the capacity, line size, block size and associativity of each level of the cache hierarchy, as well a the workload characteristics of each level of cache.

As illustrated, the tag directory 212 comprises a standard tag directory field 214 that indexes the cache arrays 210 (e.g., either by real address or virtual address). However, the tag directory 212, according to the present invention, additionally comprises a priority tag field 216 and a priority value field 218. The priority value field specifies, for each entry in the tag directory 212, the relative priority of the corresponding cache array region. The priority tag field 216 allows access to the priority value field 218 for updates. As will be described in further detail below, the priority tag field 216 and the priority value field 218 are accessible by certain instructions that function to access and update priority information for data items maintained in cache.

Figure 3:
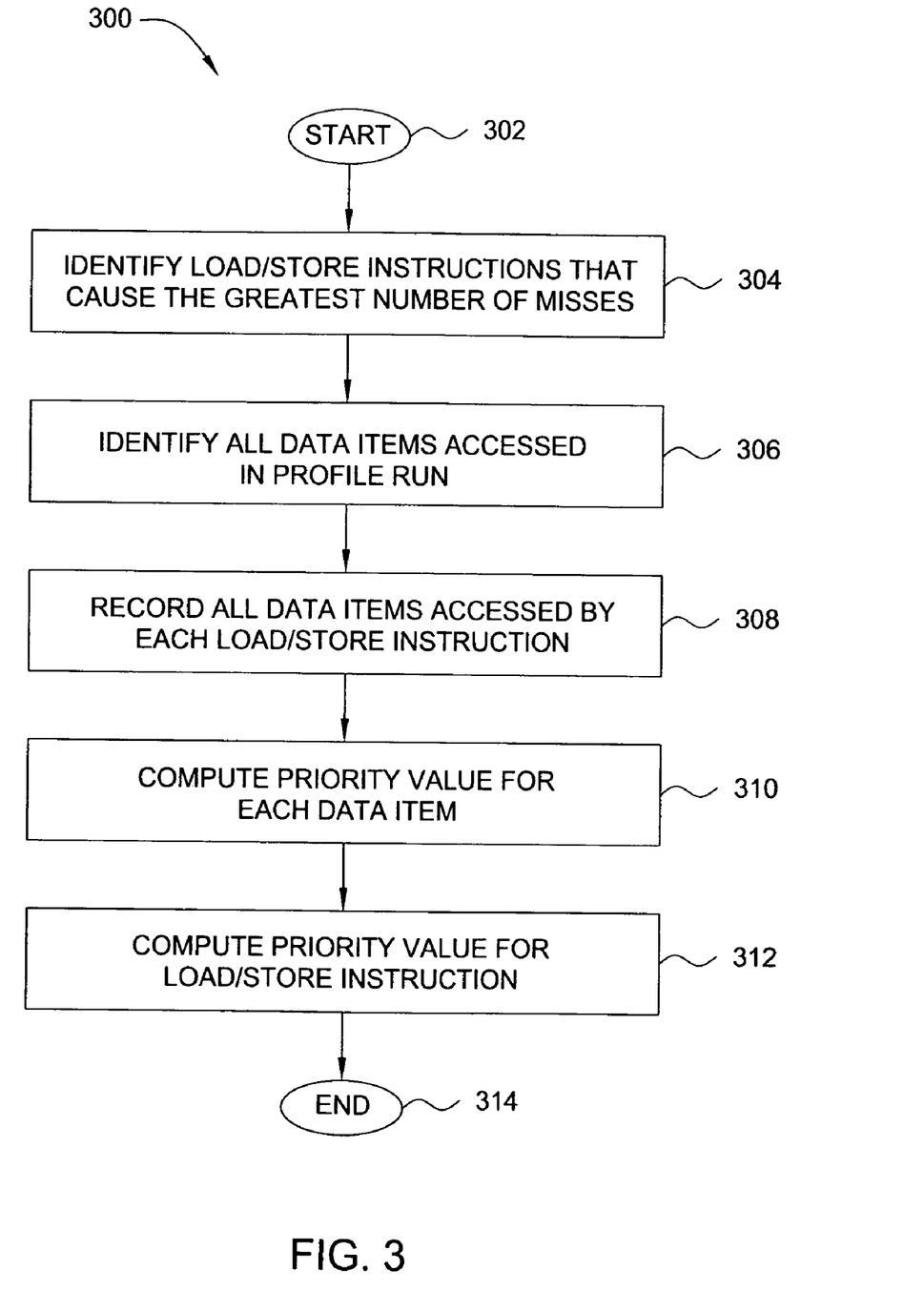
FIG. 3 is a flow diagram illustrating one embodiment of a method for assigning priority to load/store instructions, according to the present invention.

FIG. 3 is a flow diagram illustrating one embodiment of a method 300 for assigning priority to load/store instructions, according to the present invention. The method 300 may be implemented, for example, by a compiler that determines the priorities of load/store instructions for a given application. The method 300 implements a cache simulator or performance monitoring counter to profile the given application, in order to generate preliminary priorities (which may be updated at a later time).

The method 300 is initialized at step 302 and proceeds to step 304, where the method 300 identifies the load/store instructions that cause the greatest number of cache misses for the application. The method 300 then proceeds to step 306 and identifies all of the data items that are accessed by the application in the profile run. For each data item, two metrics are also recorded. The first metric is a measure of the frequency of short references to the data item, where a reference is defined as "short" when two consecutive references to the data item occur within a first threshold number of execution cycles (e.g., 10,000 cycles in one embodiment). The second metric is a measure of the frequency of long references to the data item, where a reference is defined as "long" when two consecutive references to the data item are separated by at least a second threshold number of execution cycles (e.g., one million cycles in one embodiment). The first and second metric give an approximation of the temporal behavior of the data items accessed within the application. Thus, the first threshold number and the second threshold number may be modified based on characteristics of the cache memory system, such as capacity, line size, block size and associativity.

In step 310, the method 300 computes a priority value for each of the identified data items. In one embodiment, the priority value for a given data item is obtained by multiplying the number of short references and long references to the data item by a weighing factor that normalizes the reference count. In one embodiment, the weighing factor is initially chosen arbitrarily, but is then subsequently refined based on the performance of prior profiled executions. To capture temporal locality, short references may be given a higher weight than long references.

Once priority values have been computed for each data item, the method 300 proceeds to step 312 and computes a priority value for each load/store instruction. In one embodiment, the priority value of a load/store instruction is simply the sum of the priority values of all data items accessed by the load/store instruction. Once a priority value for each load/store instruction has been calculated, the method 300 terminates in step 314.

Those skilled in the art will appreciate that the priority value calculated for the load/store instructions by the method 300 is just a heuristic; the actual priority value assigned to a load/store instruction is a priority number. The priority values generated by the method 300 may be normalized to smaller values that can be encoded in an instruction. In one embodiment, priority values are computed only for load/store instructions that will have a significant impact on the cache performance (e.g., as determined using profiling data).

Figure 4:
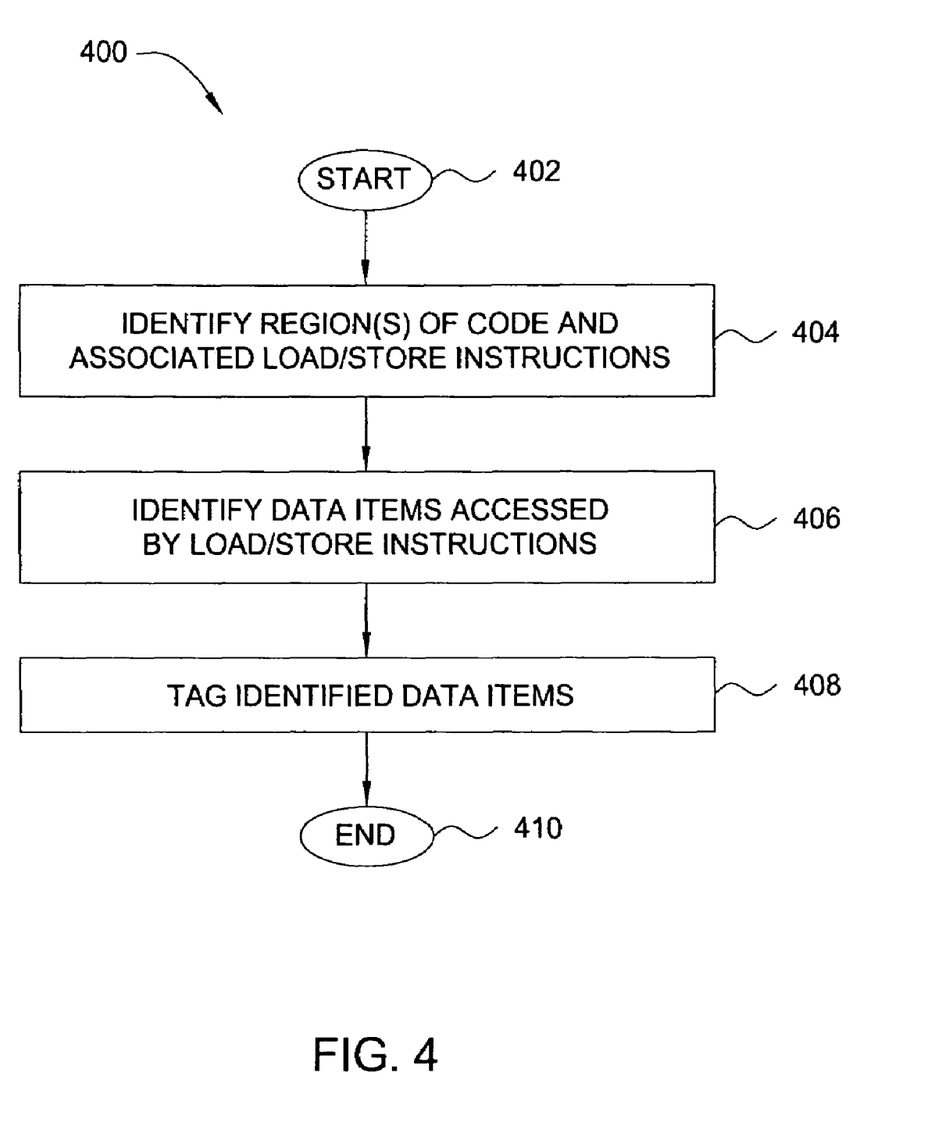
FIG. 4 is a flow diagram illustrating another embodiment of a method for assigning priority to load/store instructions, according to the present invention.

FIG. 4 is a flow diagram illustrating another embodiment of a method 400 for assigning priority to load/store instructions, according to the present invention. The method 400 may be implemented, for example, by a compiler that determines the priorities of load/store instructions for a given application. The method 400 is capable of selectively adjusting or updating the priority of data items based on a frequency with which they are addressed by a region of code during program execution.

The method 400 is initialized at step 402 and proceeds to step 404, where the method 400 identifies regions of code that make certain types of memory accesses that are difficult for traditional cache replacement schemes to capture. For example, a region of code may access a data item that is not accessed during a remainder of the program execution (or at least is not accessed again for a long time). Alternatively, a region of code may access a data item that is accessed very frequently during program execution. These regions of code may be identified in accordance with an understanding of the program semantics, or in accordance with hints supplied by a programmer. In addition to identifying these regions of code, the method 400 also identifies the load/store instructions associated with these regions of code.

Once the regions of code and associated load/store instructions have been identified, the method 400 proceeds to step 406 and identifies the data items accessed by the load/store instructions. The method 400 then tags these data items in step 408 before terminating in step 410.

In one embodiment, the identification and tagging of data items in accordance with steps 406 and 408 is accomplished using a special load/store instruction, referred to herein as an address capture load/store instruction. This address/capture load/store instruction replaces the load/store instruction identified in step 404. An address capture load/store instruction will, when executed, automatically update the priority tag field of tag entries corresponding to the data items (residing in the cache arrays) accessed by it, thus recording/updating the range of the memory region referenced therein. One embodiment of an address capture load/store instruction uses the priority tag as an additional operand.

Another embodiment of an address capture load/store instruction uses an additional bit in the load/store instruction operational code to realize the address capture load/store instructions. This embodiment requires an additional instruction to set the priority tag register used by the address capture instructions. In this embodiment, a unique priority tag is loaded to the priority tag register at the beginning of the code region, this priority tag being used by the address capture load/store instructions in the code region. At the end of the code region, an update priority range (UPR) instruction is inserted which, when executed, will change the priority of all cache array elements associated with a given priority tag field value. One format of a UPR instruction may be given as UPR PriorityTag, PriorityValue, where the PriorityTag and PriorityValue may be specified as either immediate operand values (constants) or as register operands that specify the registers storing the values.

Figure 5:
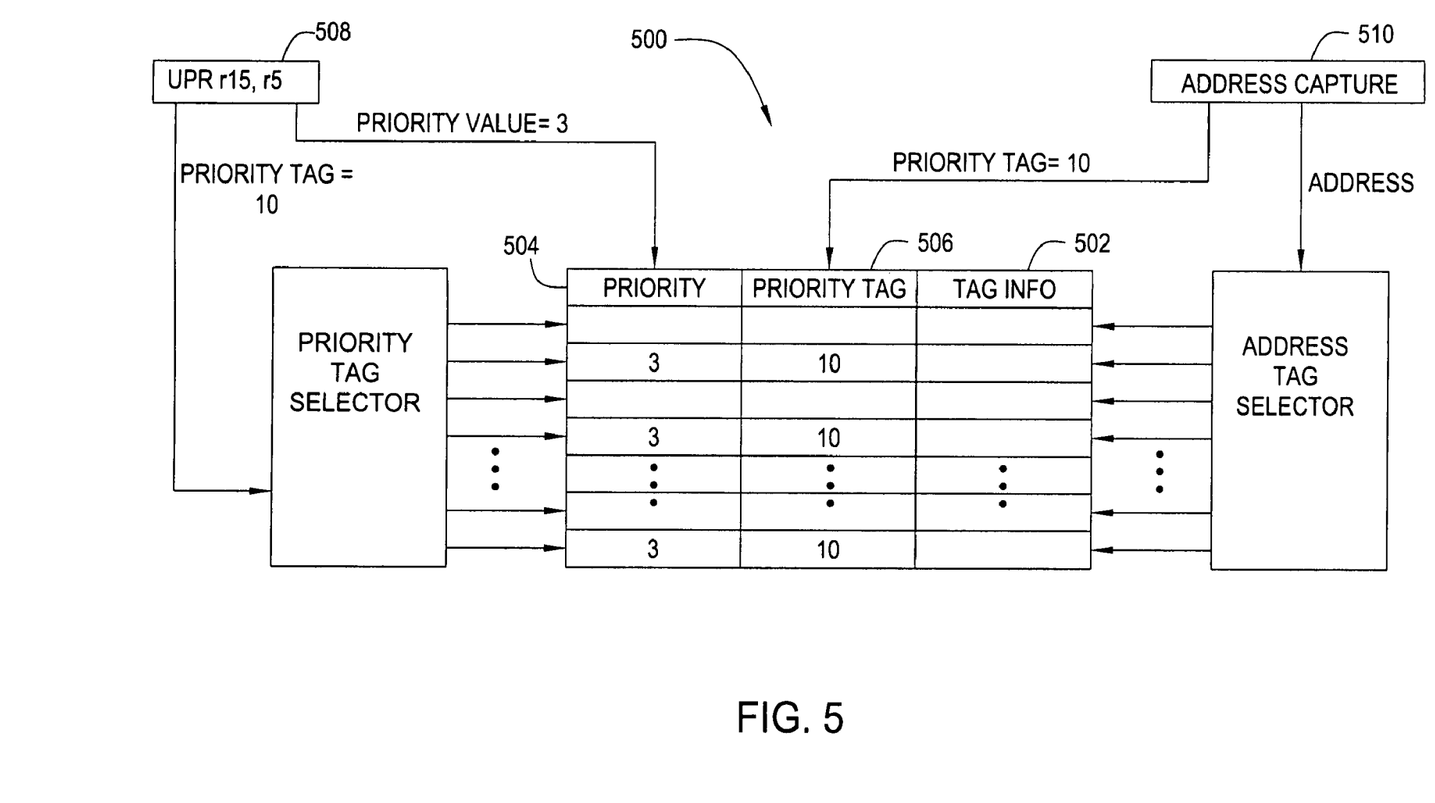
FIG. 5 is a high-level block diagram illustrating one embodiment of a cache tag directory, according to the present invention.

FIG. 5 is a high-level block diagram illustrating one embodiment of a cache tag directory 500, according to the present invention. As discussed with reference to FIG. 2, the tag directory 500 includes, in addition to a traditional tag information field 502, a priority value field 504 and a priority tag field 506. In addition, the method 500 illustrates the data paths needed for implementing an exemplary UPR instruction 508 and an exemplary address capture load/store instruction 510, as well as instructions that update the priority value field 504.

As discussed above, the address capture load/store instruction 510 is capable of updating both the tag information field 502 and the priority tag field 506. The load/store instruction that can set priority of the cached data updates the tag information as well as the priority value specified by the instruction. It is worth noting that the tag directory 500 is searched on both hit and miss conditions for every memory access; thus, updating an already selected field in the tag directory 500 corresponding to the data accessed by the load/store instruction is a trivial operation.

The UPR instruction 508 specifies the priority tag and the priority value (as recorded, respectively, in the priority tag field 506 and the priority value field 504 of the tag directory 500). When the UPR instruction 508 is executed, the priority tag field 506 is searched in parallel, and the matching entries' corresponding priority value fields 504 are updated with the new priority value specified in the UPR instruction 508. This operation may be considered equivalent to a tag lookup, and therefore takes approximately the same amount of time (e.g., less than one cycle) to execute. However, it is worth noting that: (1) a UPR instruction is optional, and therefore a delay in the execution of a UPR instruction is substantially insignificant; and (2) the execution of a UPR instruction does not affect the correctness of the program, and therefore can be accomplished in less aggressive ways.

A compiler can statically assign priority tags in a single process/thread environment such as an embedded system. However, the priority tags need to be unique for optimal performance in a multiprocessing environment. An operating system or hypervisor can provide this information to the application programs. There are several ways for an operating system to issue a unique number/token to an application and to track the number's expiration. For example, a concatenation of process identifier and counter value can yield such a number to be used as the priority tag.

Figure 8:
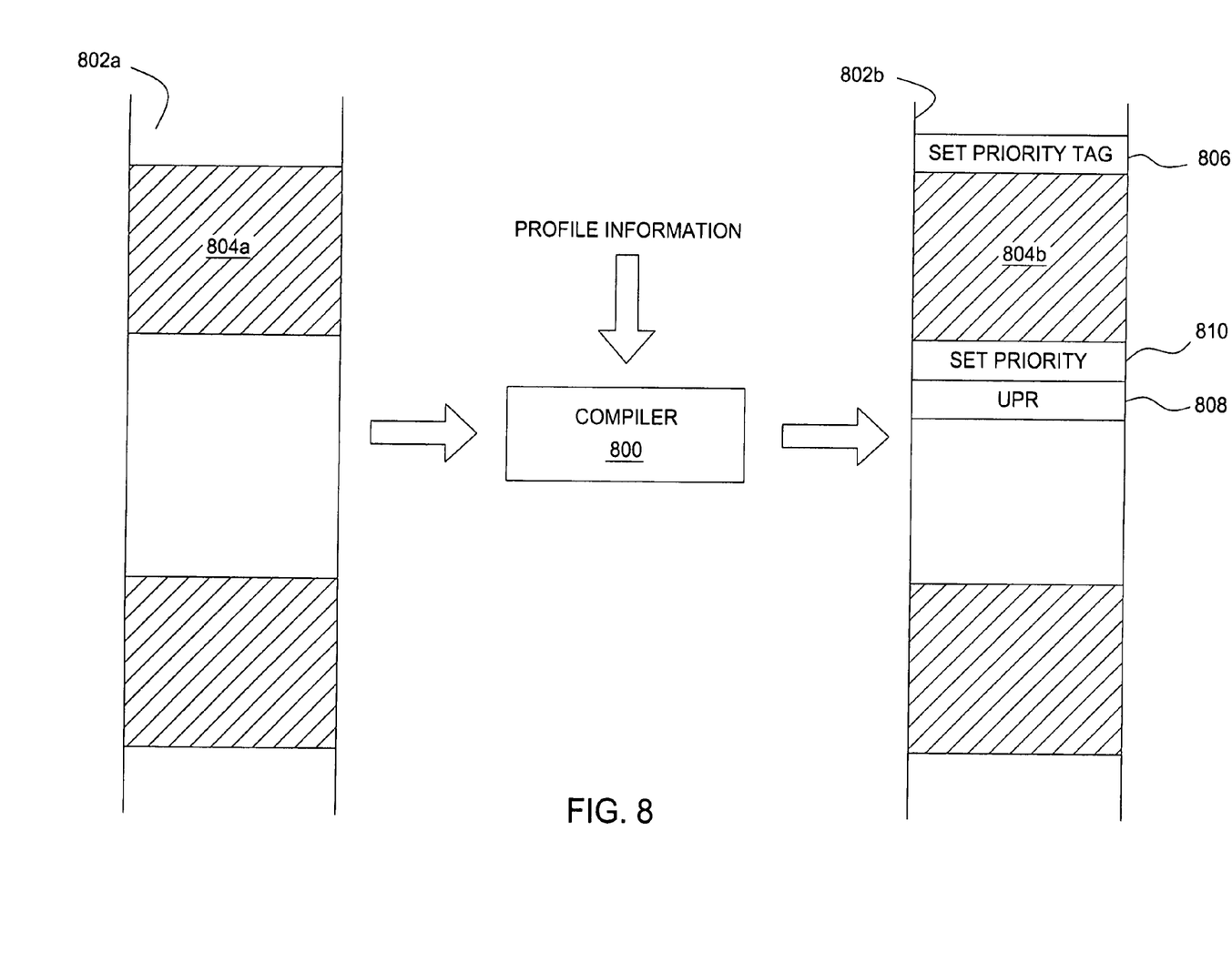
FIG. 8 is a schematic illustration of a compiler or binary re-writing tool that generates code to convert an original program binary to a cache-aware program binary, based on application profile information.

FIG. 8, for example, is a schematic illustration of a compiler or binary re-writing tool 800 that generates code to convert an original program binary 802a to a cache-aware program binary 802b, based on application profile information. As illustrated, a region of code 804a in the original program binary 802a is updated by execution of an address capture load/store instruction that "captures" a range of memory. The resultant updated region of code 804b comprises a unique priority tag 806 loaded at the beginning of the code region (the priority tag 806 being used by the address capture load/store instructions in the updated region of code 804b, an update priority range (UPR) instruction 808 inserted at the end of the updated region of code 804b (which, when executed, will change the priority of all cache array elements associated with the given priority tag 806) and a priority value 810.

Most data processing systems use an operating system to support a multiprogramming environment for concurrent execution of multiple processes or threads via time sharing of resources. When a simultaneous multithreading processor is used the processor itself provides support for concurrent execution of instructions from multiple threads, in addition to the operating system. In such multiprogramming environments, the operating system or hypervisor may be used for managing and keeping track of the priority tag and priority value assigned by a process or thread. A system call may be used by a process to obtain an unassigned priority tag value from the operating system. Changing the priority of cached data accessed by a process or thread can potentially affect the performance of other processes in a multiprogramming environment. Therefore, it may be desirable to change the priority of the cache resident data belonging to a process based on global knowledge about the memory access characteristics of all of the active processes in the system, rather than based only on knowledge about the memory access characteristics of individual processes.

Figure 9:
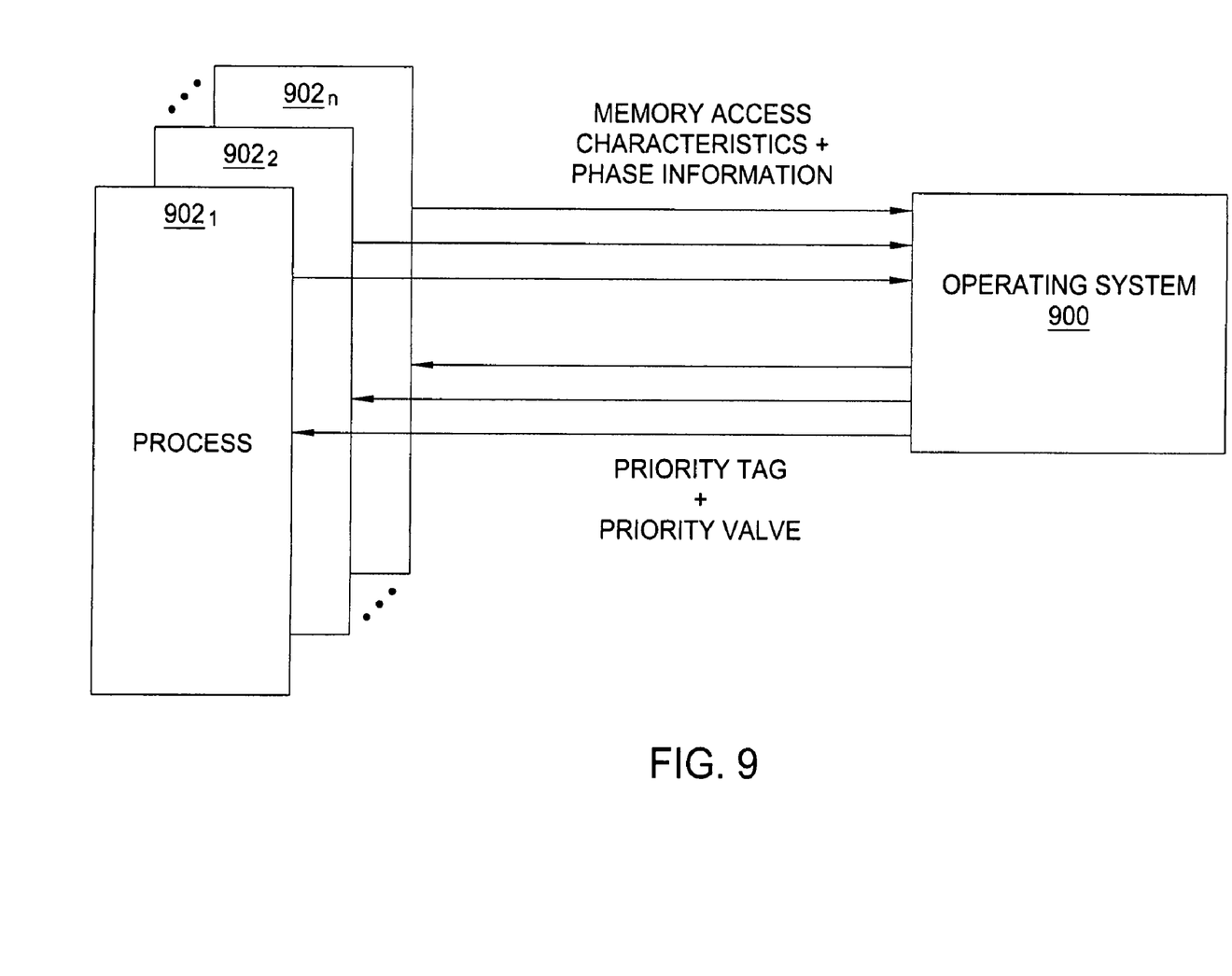
FIG. 9 is a high-level block diagram illustrating one embodiment of a modified operating system or hypervisor that can provide a centralized repository for tracking the dynamic memory requirements and priorities of processes, according to the present invention.

FIG. 9 is a high-level block diagram illustrating one embodiment of a modified operating system or hypervisor 900 that can provide a centralized repository for tracking the dynamic memory requirements and priorities of processes, according to the present invention. Individual programs (e.g., processes or threads running under the operating system) 902$_1$-902$_n$ (hereinafter collectively referred to as "processes 902") inform the operating system 900 of their memory access characteristics and phase behavior at various intervals during the execution. Based on this global information, the operating system 900 provides dynamically computed priority values to the processes 902, as well as priority tags. Priority values are computed based on optimization criteria (e.g., none of the processes 902 will be "starved"). In some embodiments of the invention, the hardware structures described herein can support such a multiprogramming environment, wherein the priority of a cached data item is changed to a dynamically computed priority value with the assistance of a modified operating system or hypervisor during the execution.

Figure 6:
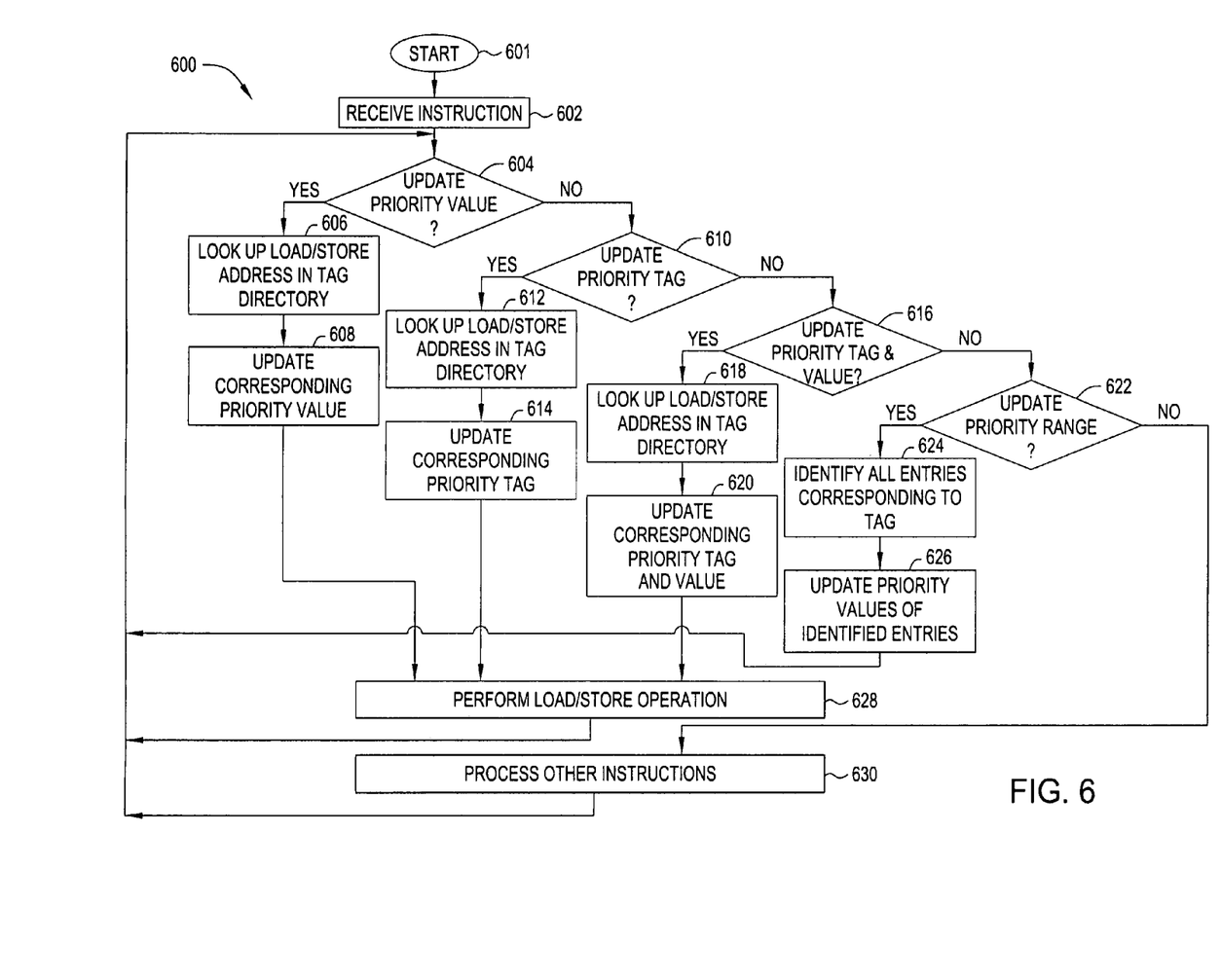
FIG. 6 is a flow diagram illustrating one embodiment of a method for processing instructions, according to the present invention.

FIG. 6 is a flow diagram illustrating one embodiment of a method 600 for processing instructions, according to the present invention. The method 600 is initialized at step 601 and proceeds to step 602, where the method 600 receives an instruction (e.g., a load/store instruction). The method 600 then proceeds to step 604 and determines whether to update a priority value of a data item in cache, in accordance with the received instruction.

If the method 600 concludes in step 604 that the priority value of a data item in cache should be updated, the method 600 proceeds to step 606 and looks up the load/store address in the cache tag directory. The method 600 then proceeds to step 608 and updates the priority value of the corresponding data item before performing the load/store operation in step 628. The method 600 then returns to step 604 and continues as described above to process the received instruction.

Alternatively, if the method 600 concludes in step 604 that the priority value of a data item in cache should not be updated, the method 600 proceeds to step 610 and determines whether to update a priority tag of a data item in cache, in accordance with the received instruction.

If the method 600 concludes in step 610 that the priority tag of a data item in cache should be updated, the method 600 proceeds to step 612 and looks up the load/store address in the cache tag directory. The method 600 then proceeds to step 614 and updates the priority tag of the corresponding data item before performing the load/store operation in step 628. The method 600 then returns to step 604 and continues as described above to process the received instruction.

Alternatively, if the method 600 concludes in step 610 that the priority tag of a data item in cache should not be updated, the method 600 proceeds to step 616 and determines whether to update a priority tag and value of a data item in cache, in accordance with the received instruction.

If the method 600 concludes in step 616 that the priority tag and value of a data item in cache should be updated, the method 600 proceeds to step 618 and looks up the load/store address in the cache tag directory. The method 600 then proceeds to step 620 and updates the priority tag and value of the corresponding data item before performing the load/store operation in step 628. The method 600 then returns to step 604 and continues as described above to process the received instruction.

Alternatively, if the method 600 concludes in step 616 that the priority tag and value of a data item in cache should not be updated, the method 600 proceeds to step 622 and determines whether to update a priority range for one or more data items in cache, in accordance with the received instruction.

If the method 600 concludes in step 622 that the priority range for one or more data items in cache should be updated, the method 600 proceeds to step 624 and identifies all entries in the tag directory that correspond to a tag specified in the received instruction. The method 600 then proceeds to step 626 and updates the priority values of the identified entries. Once the appropriate entries have been updated, the method 600 proceeds to step 630 and processes for any other instructions before returning to step 604 and continuing as described above to process the received instruction.

Figure 7:
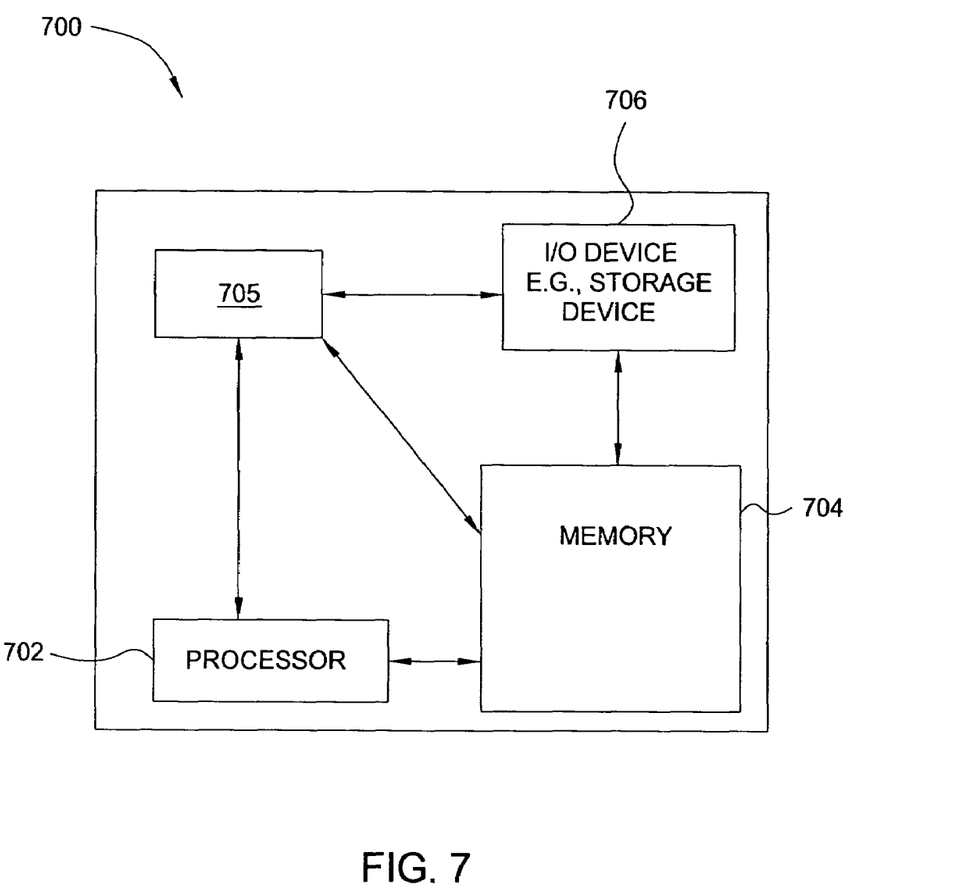
FIG. 7 is a high level block diagram of the data caching method that is implemented using a general purpose computing device.

FIG. 7 is a high level block diagram of the data caching method that is implemented using a general purpose computing device 700. In one embodiment, a general purpose computing device 700 comprises a processor 702, a memory 704, a data caching module 705 and various input/output (I/O) devices 706 such as a display, a keyboard, a mouse, a modem, and the like. In one embodiment, at least one I/O device is a storage device (e.g., a disk drive, an optical disk drive, a floppy disk drive). It should be understood that the data caching module 705 can be implemented as a physical device or subsystem that is coupled to a processor through a communication channel.

Alternatively, the data caching module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the data caching module 705 for loading and storing data described herein with reference to the preceding Figures can be stored on a computer readable medium or carrier (e.g., RAM, magnetic or optical drive or diskette, and the like).

The present invention therefore represents a cooperation between hardware and software to manage cache contents. The hardware is responsible for maintaining priorities in the tag directory and comparing priorities while making cache replacement decisions. The software (compiler), on the other hand, is responsible for deciding the priorities of the load/store instructions based on prior analysis of a program.

Thus, the present invention represents a significant advancement in the field of data processing systems. Embodiments of the present invention assign one of a plurality of priority levels to each data item in cache, based on the data item's reuse properties. When a new data item is to be loaded into cache, a data item with a higher priority level will always replace a data item with a lower priority level in the same cache set. Thus, the replacement of data items can be manipulated by assigning different priority values to reduce the occurrence of cache "misses" and narrow the performance gap between the processor and the memory system.

While the foregoing is directed to the preferred embodiment of the present invention, other and further embodiments of the invention may be devised without departing from the basic scope thereof, and the scope thereof is determined by the claims that follow.

The invention claimed is:

1. A method for managing data in a cache memory system, the method comprising:
    assigning relative priority values to at least a subset of data items in the cache memory system, wherein the assigning comprises:
        identifying one or more regions of code that require prioritized data items;
        identifying one or more load/store instructions associated with the one or more regions of code;
        identifying one or more data items accessed by the one or more load/store instructions; and
        tagging the one or more data items to reflect relative priorities of the one or more data items by executing an address capture load/store instruction that updates priority tag fields of entries in a tag directory that correspond to the one or more data items, wherein the address capture load/store instruction comprises:
            a priority tag loaded to a priority tag register at a beginning of a given one of the one or more regions of code; and
            an update priority range instruction inserted at an end of the given one of the one or more regions of code;
    fetching a new data item to load into the cache memory system, the new data item being associated with a priority value; and
    selecting an existing data item from the cache memory system to replace with the new data item, in accordance with the relative priority values and the priority value associated with the new data item.

2. The method of claim 1, wherein the update priority range instruction comprises:
    a priority tag for at least one tag directory entry; and
    a priority value for the at least one tag directory entry.

3. The method of claim 2, wherein execution of the update priority range instruction comprises:
    searching a priority tag field of the tag directory for priority tag fields that match the priority tag specified in the update priority range instruction; and
    changing a priority value of any entries in the tag directory that correspond to the matching priority tag fields, such that the priority values of those entries match the priority value specified in the update priority range instruction.

4. The method of claim 2, wherein a value of the priority tag is dynamically computed by an operating system or hypervisor in accordance with global knowledge of application memory access characteristics and phase behavior.

5. The method of claim 1, wherein the priority values are based on reuse properties of the at least a subset of data items.

6. The method of claim 1, wherein the selecting comprises:
    replacing an existing data item associated with a lower priority value than the priority value associated with the new data item, if an existing data item associated with a lower priority value exists in the cache; and
    replacing an existing data item in accordance with a hardware-managed default replacement policy, if an existing data item associated with a lower priority value than the priority value associated with the new data item does not exist in the cache.

7. The method of claim 6, wherein the default replacement policy is to replace an existing data item that is least recently used.

8. The method of claim 7, further comprising:
    assuming a median priority value for an existing data item that does not have a priority value.

9. The method of claim 1, wherein identifying the one or more regions of code is performed in accordance with programmer-supplied hints.

10. The method of claim 1, wherein the relative priority values are computed for each of the data items in accordance with respective short references and long references.

11. The method of claim 10, wherein a short reference to a data item comprises an instance in which two consecutive references to the data item occur within a threshold number of execution cycles.

12. The method of claim 10, wherein a long reference to a data item comprises an instance in which two consecutive references to the data item are separated by at least a threshold number of execution cycles.

13. The method of claim 10, wherein the short references and long references are normalized by a weighing factor.

14. The method of claim 13, wherein the short references are given a higher weight than the long references.

15. The method of claim 1, wherein the tag directory is maintained by hardware.

16. The method of claim 1, wherein the selecting is performed by hardware.

17. The method of claim 1, wherein the assigning is performed by software.

18. The method of claim 17, wherein the software performs, the assigning based on a prior analysis of a program that uses the one or more load/store instructions.

19. A method for managing data in a cache memory system, the method comprising:
    assigning relative priority values to at least a subset of data items in the cache memory system, wherein the assigning comprises:
        identifying one or more regions of code that require prioritized data items;
        identifying one or more load/store instructions associated with the one or more regions of code;
        identifying one or more data items accessed by the one or more load/store instructions; and
        tagging the one or more data items to reflect relative priorities of the one or more data items by executing an address capture load/store instruction that updates priority tag fields of entries in a tag directory that correspond to the one or more data items, wherein the address capture load/store instruction comprises:
            a priority tag loaded to a priority tag register at a beginning of a given one of the one or more regions of code; and an update priority range instruction inserted at an end of the given one of the one or more regions of code, wherein the update priority range instruction comprises:
    a priority tag for at least one tag directory entry; and
    a priority value for the at least one tag directory entry;
fetching a new data item to load into the cache memory system, the new data item being associated with a priority value; and
selecting an existing data item from the cache memory system to replace with the new data item, in accordance with the relative priority values and the priority value associated with the new data item.

20. A method for managing data in a cache memory system, the method comprising:
    assigning relative priority values to at least a subset of data items in the cache memory system, wherein the assigning comprises:
        identifying one or more regions of code that require prioritized data items;
        identifying one or more load/store instructions associated with the one or more regions of code;
        identifying one or more data items accessed by the one or more load/store instructions; and
        tagging the one or more data items to reflect relative priorities of the one or more data items by executing an address capture load/store instruction that updates priority tag fields of entries in a tag directory that correspond to the one or more data items, wherein the address capture load/store instruction comprises:
            a priority tag loaded to a priority tag register at a beginning of a given one of the one or more regions of code; and
            an update priority range instruction inserted at an end of the given one of the one or more regions of code, wherein the update priority range instruction comprises:
                a priority tag for at least one tag directory entry; and
                a priority value for the at least one tag directory entry;
    fetching a new data item to load into the cache memory system, the new data item being associated with a priority value; and
    selecting an existing data item from the cache memory system to replace with the new data item, in accordance with the relative priority values and the priority value associated with the new data item, wherein execution of the update priority range instruction comprises:
        searching a priority tag field of the tag directory for priority tag fields that match the priority tag specified in the update priority range instruction; and
        changing a priority value of any entries in the tag directory that correspond to the matching priority tag fields, such that the priority values of those entries match the priority value specified in the update priority range instruction.

* * * * *